Dec. 31, 1963 A. W. THIEL 3,115,677
APPARATUS FOR THE PRODUCTION OF SHAPED PLASTIC WORKPIECES
Filed Nov. 4, 1958 9 Sheets-Sheet 3
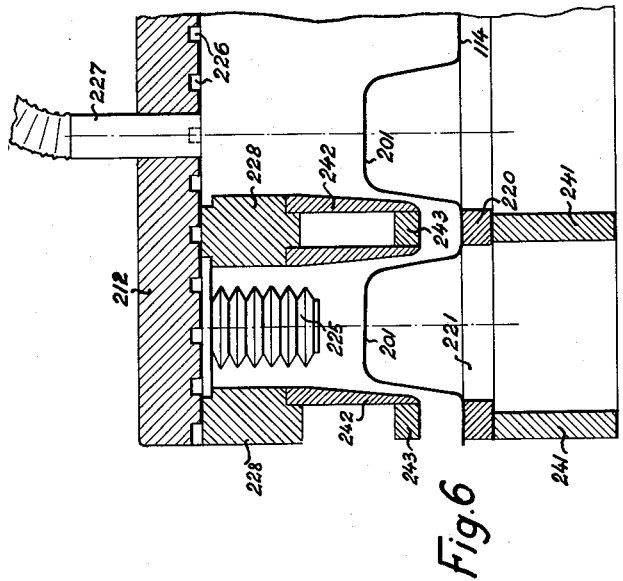
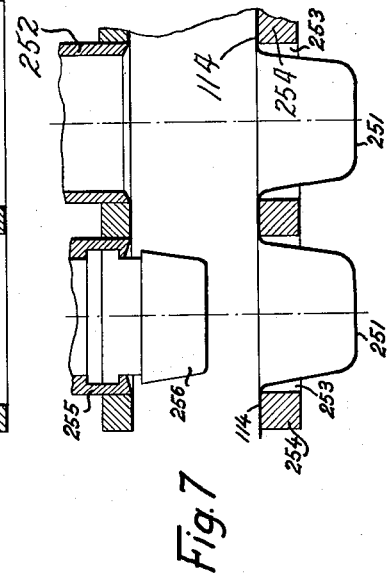
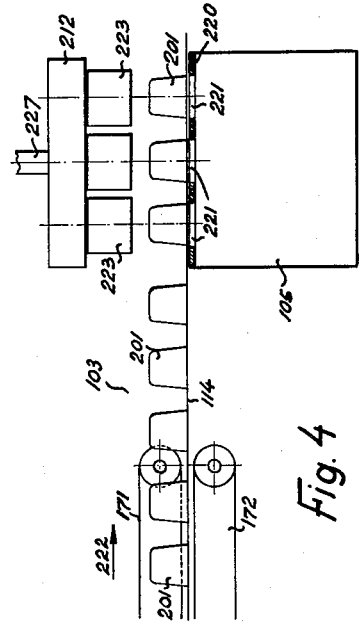
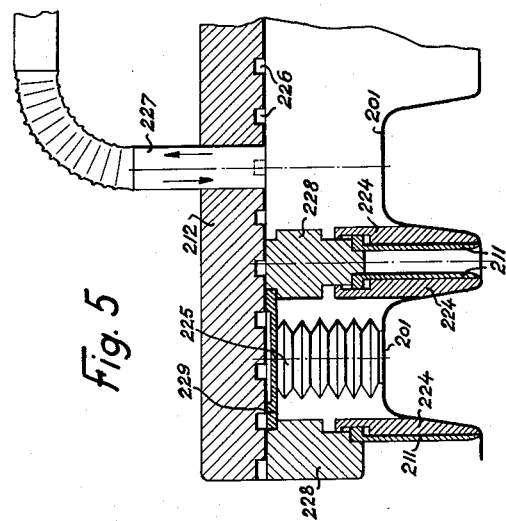
INVENTOR
ALFONS WILHELM THIEL Dec. 31, 1963 A. W. THIEL 3,115,677
APPARATUS FOR THE PRODUCTION OF SHAPED PLASTIC WORKPIECES
Filed Nov. 4, 1958 9 Sheets-Sheet 4
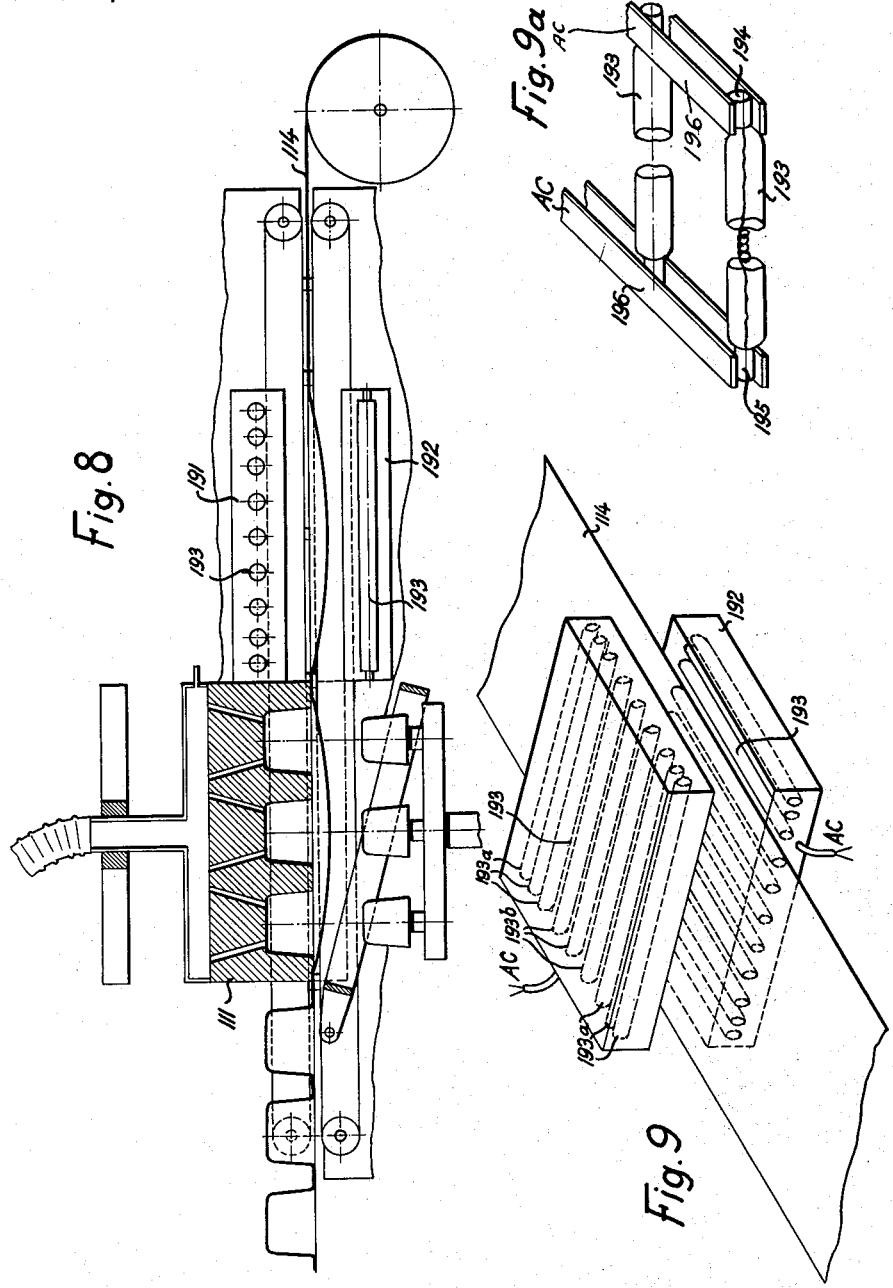
INVENTOR
ALFONS WILHELM THIEL Dec. 31, 1963 A. W. THIEL 3,115,677
APPARATUS FOR THE PRODUCTION OF SHAPED PLASTIC WORKPIECES
Filed Nov. 4, 1958 9 Sheets-Sheet 5
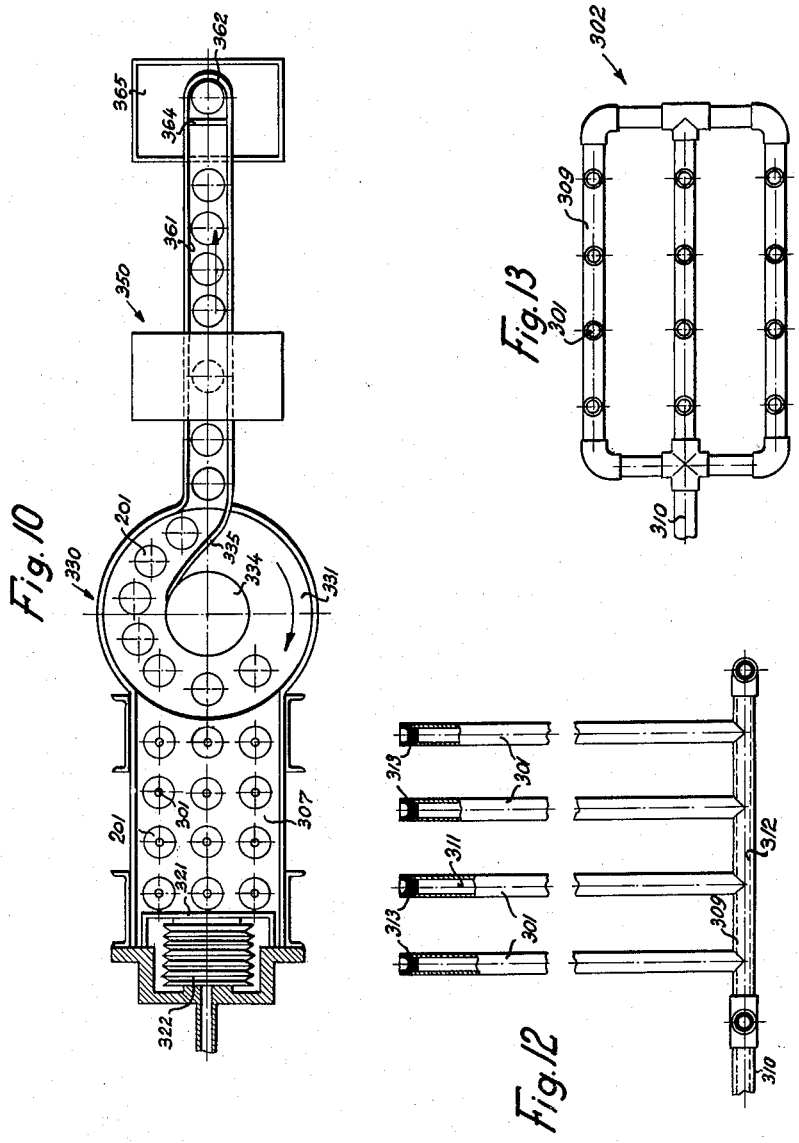
INVENTOR
ALFONS WILHELM THIEL Dec. 31, 1963 A. W. THIEL 3,115,677
APPARATUS FOR THE PRODUCTION OF SHAPED PLASTIC WORKPIECES
Filed Nov. 4, 1958 9 Sheets-Sheet 6

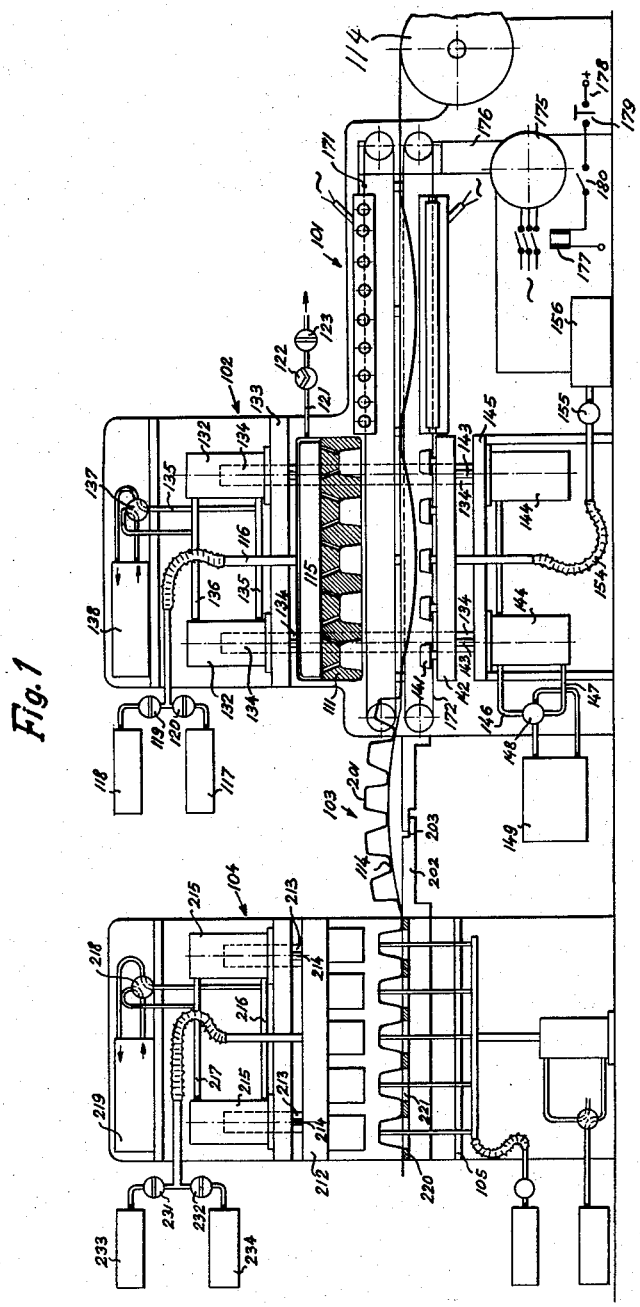

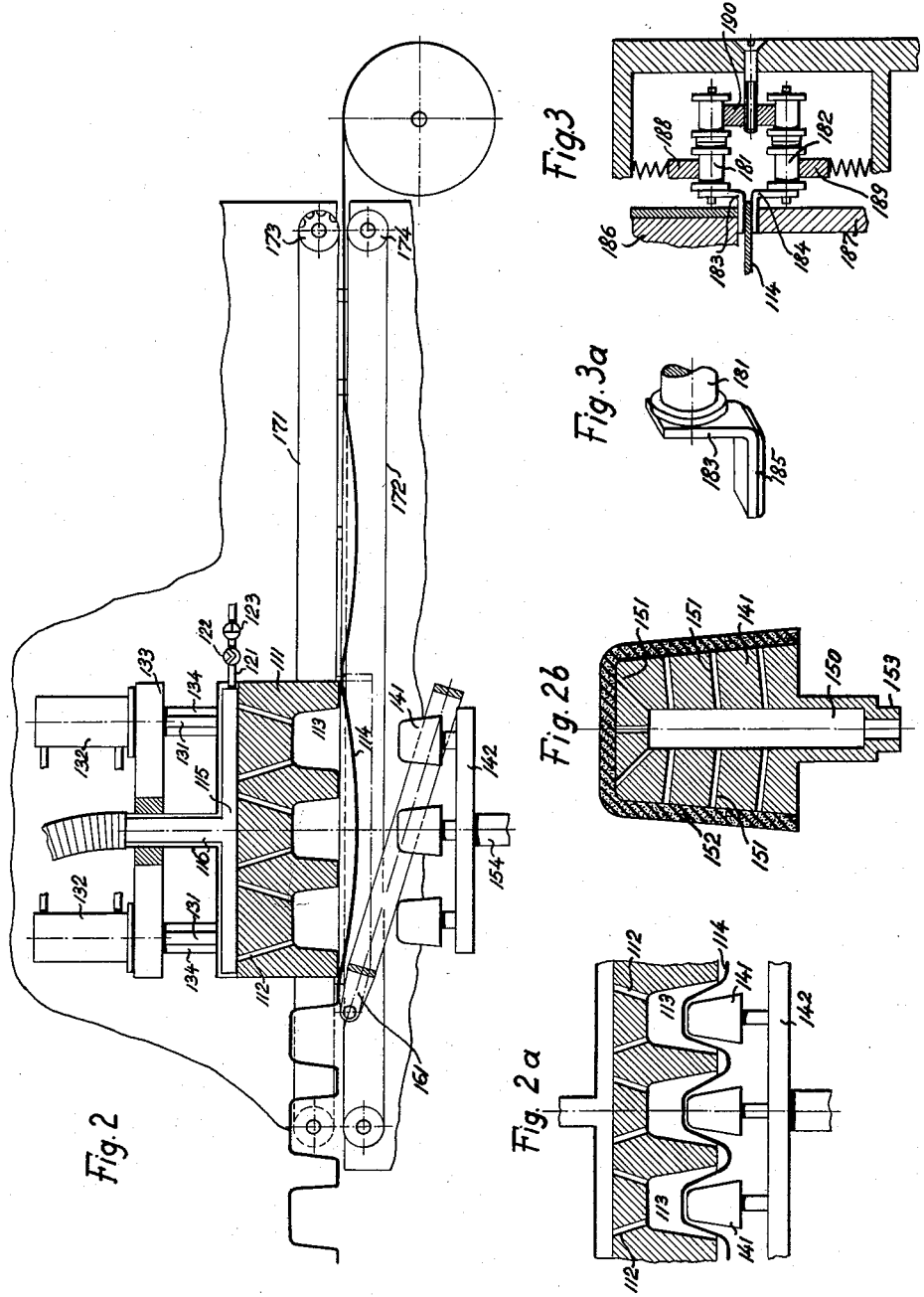

Fig.11

INVENTOR
ALFONS WILHELM THIEL

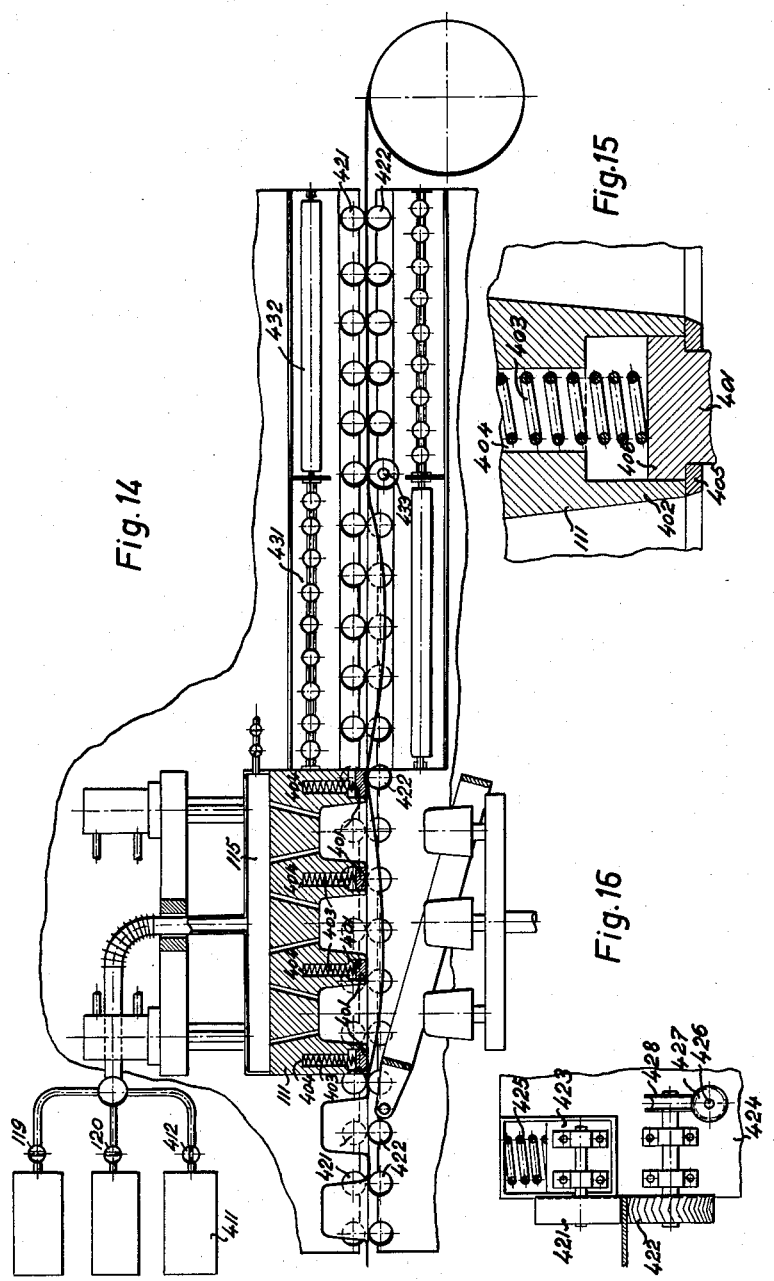

Dec. 31, 1963    A. W. THIEL    3,115,677
APPARATUS FOR THE PRODUCTION OF SHAPED PLASTIC WORKPIECES
Filed Nov. 4, 1958    9 Sheets-Sheet 8
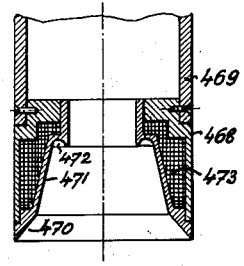
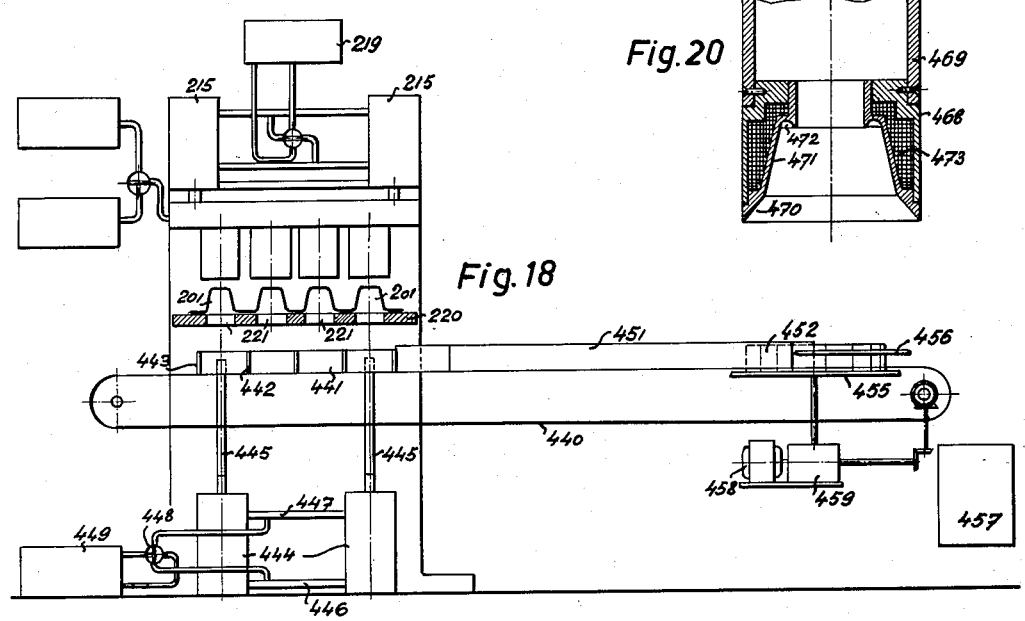
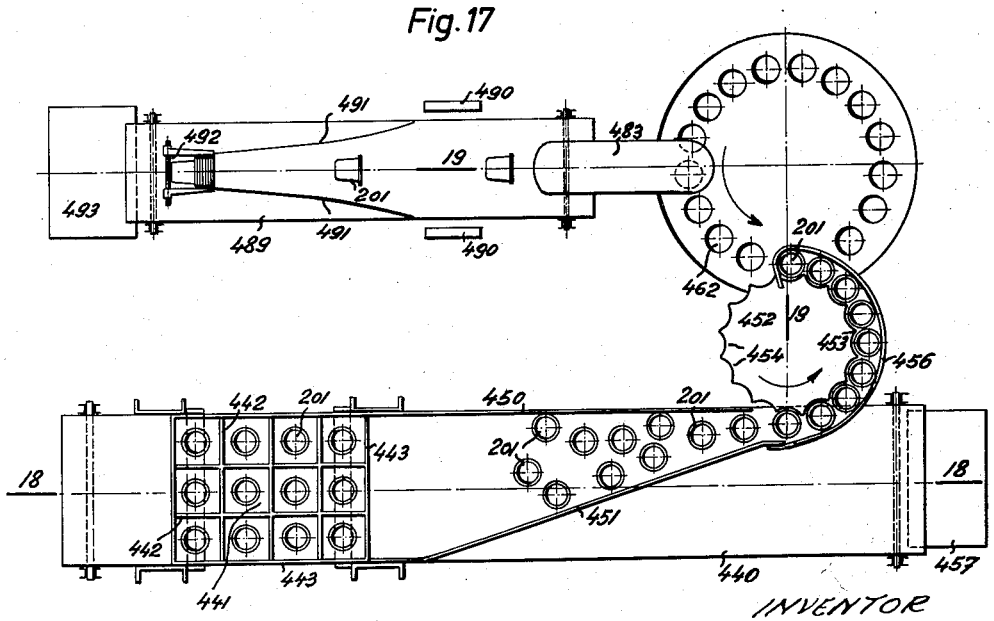
INVENTOR
ALFONS WILHELM THIEL

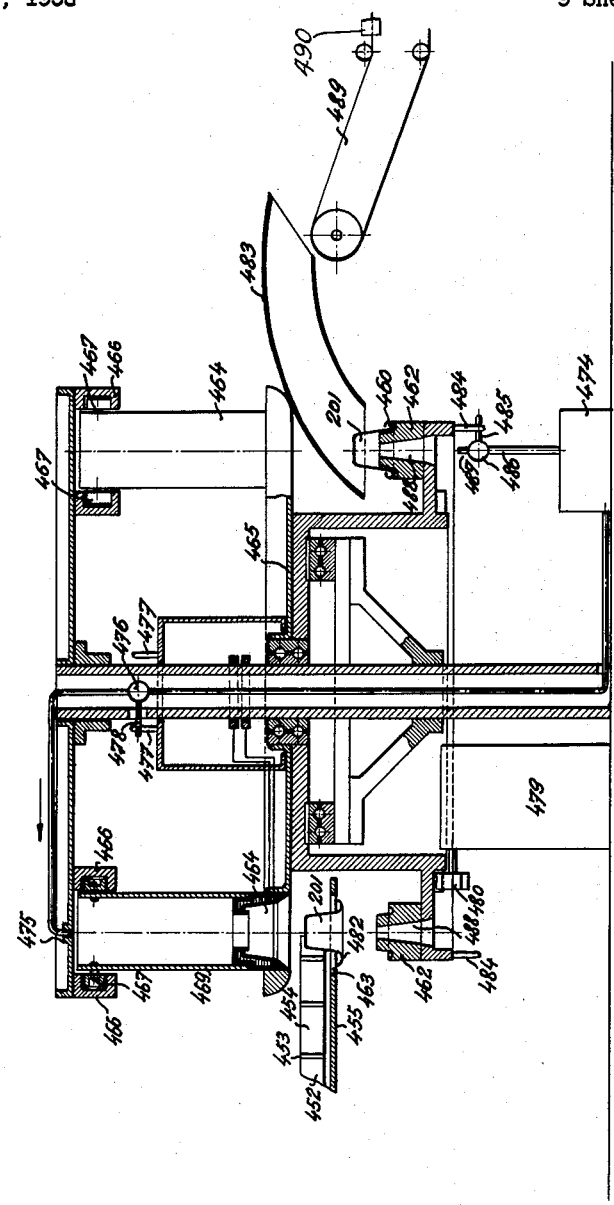

United States Patent Office 3,115,677
Patented Dec. 31, 1963

3,115,677
APPARATUS FOR THE PRODUCTION OF SHAPED PLASTIC WORKPIECES
Alfons Wilhelm Thiel, Raimundistr. 11, Mainz, Germany
Filed Nov. 4, 1958, Ser. No. 771,864
Claims priority, application Germany Nov. 8, 1957
12 Claims. (Cl. 18—19)

This invention relates to apparatus for the production of shaped plastic workpieces, more particularly apparatus wherein a pre-heated band of thermoplastic synthetic material is stamped to the form of the shaped workpieces in a vacuum deep-drawing process, and the said workpieces are then cut out of the band.

The object of the invention is to provide an apparatus wherein the working operations of pre-heating, shaping, cooling and cutting out the shaped pieces from the band are made to follow one another directly, so as to permit feeding the apparatus at one end with the band of thermoplastic synthetic material and to take the finished shaped workpieces from the other end. Hitherto this has not been possible since on the one hand during the vacuum shaping of the plastic band such considerable difficulties occurred that it has hitherto only been possible to feed a shaping apparatus of this kind with the plastic in the form of pre-heated slabs pre-cut to suit the shaping tool. The pre-heating time and the shaping time had to be adjusted individually for each slab. Only after a relatively long cooling time was it then possible to cut out the workpieces from the plastic slabs, and for this purpose the slab had to be fed very accurately to a cutting device. All these disadvantages and difficulties are obviated by the apparatus according to the present invention.

According to this invention apparatus for the continuous production of shaped workpieces from plastic material by vacuum deformation of a band of thermoplastic synthetic material and punching the shaped workpieces from the band is characterised in that a heating device for the band to be deformed, a shaping device and a device for punching shaped workpieces out of the band are disposed immediately following each other and are provided with a common conveying device for the stepwise advance of the band.

This makes it possible for all these individual devices to be adjusted to a common length of feed step. As a result, the difficulties which occur with a thermoplastic synthetic material which is to be processed in the form of a band are completely eliminated.

The shaped plastic workpieces coming from the shaping device and still connected to the plastic band are punched accurately out of the said band. For this purpose there is provided between the shaping device and the punching device a cooling path for the shaped band, the length of this path being less than one feed step of the conveying device by an amount within the range of 0.5% to 1.0% of a feed step and being adjustable. At the same time the punching device can be provided with at least one locating device, which brings the shaped parts of the band into an accurate position relatively to the cutting dies by displacement of the band.

It is desirable, particularly in the case of very deep shaped workpieces, to ensure that the wall thickness of the article produced is as uniform as possible. This is particularly important for drinking cups or similar workpieces. In order to obtain a relatively uniform wall thickness for the workpiece, a shaping tool of the shaping device can be disposed above the band and provided with a device for effecting evacuation of the tool, which device comprises a valve arrangement for the control of the timing of the evacuation, the shaping tool being adapted to bear with its lower edges against the plastic band in gas-tight manner in order that, when the draw-promoting elements connected to the shaping tool move towards the latter, pressure can be produced between the shaping tool and the plastic band. This more especially achieves the result that even before the actual shaping operation, the plastic band is adequately stretched at the desired points outside the shaping tool, in order to give a uniform wall thickness subsequently within the shaping tool.

It also is desirable to maintain the most uniform possible working conditions when operating upon each band section corresponding to a feed step. More particularly, the plastic band is uniformly warmed through over the entire surface of a section which corresponds to one feed step, in order that, especially when a relatively large number of parts are shaped at each feed step, these parts should be as uniform as possible with one another. For this purpose, there is provided an arrangement of heating elements wherein the said heating elements are mounted displaceably in the interior of a heater so that at the edge of the band, for example, these heating elements can be arranged in a substantially closer arrangement than at the central portion, in order to compensate for heat losses at the margins of the bands.

At each feed step of the conveying device all the shaped parts in the section of the band which corresponds to this feed step should be severed from the band at one punching stroke. In order to permit this without incurring the risks that parts of the shaped workpieces will be cut up during the punching operation, each individual cutting die can be combined with a locating device which engages the article to be punched out before the cutting die comes into action, and brings the said article into the correct position relatively to the cutting die.

Shaped workpieces which are intended for special purposes and must exhibit particular accuracy, for example shaped workpieces which are delivered by automatic machines, are subjected to the action of a second punching device which trims each individual workpiece with one and the same cutting die.

The punched-out shaped workpieces are collected and passed on for checking and packing.

One embodiment of the invention is illustrated in the accompanying drawings, wherein:

FIG. 1 is a diagrammatic elevation of the apparatus;
FIG. 2 is a sectional elevation of the shaping device;
FIGS. 2a and 2b are sectional elevations of details of the shaping device.
FIGS. 3 and 3a are, respectively, a fragmentary sectional elevation and a perspective view of details of the conveying device;
FIG. 4 is an elevation of the punching device;
FIGS. 5, 6 and 7 are fragmentary sectional elevations of modified forms of parts of the punching device;
FIG. 8 is an elevation showing the relation of the heating device to the shaping tool;
FIGS. 9 and 9a are perspective views of details of the heating device;
FIGS. 10 and 11 are, respectively, a plan view and a diagrammatic elevation, partly in section, showing the means for collecting and forwarding the punched-out shaped workpieces;
FIGS. 12 and 13 show details of the device for collecting the punched-out shaped workpieces;
FIG. 14 shows a modified embodiment of the shaping device in a sectional elevation;
FIGS. 15 and 16 are sectional elevations of details of the shaping device according to FIG. 14;
FIG. 17 is a plan view showing modified means for collecting and forwarding the punched out shaped workpieces;
FIG. 18 is a diagrammatic elevation partly in section according to line 18—18 of FIG. 17;

FIG. 19 is a diagrammatic elevation in section according to line 19—19 of FIG. 17 and FIG. 20 is a sectional elevation of a detail of FIG. 19.

The apparatus comprises (FIG. 1) a heating device 101, a shaping device 102, a cooling path 103, a punching-out device 104 and a device 105 for collecting and forwarding the punched-out shaped workpieces. The shaping device 102 (FIG. 2) comprises a shaping tool 111, for vacuum deep-drawing deformation work, which is mounted so as to be displaceable vertically. The shaping tool 111 is provided internally with ducts 112 through which shaping cavities 113 are evacuated of air. A preheated band 114, bearing close against the cavities 113, will then be sucked into the shaping tool 111. The ducts 112 extend from a common chamber 115 above the shaping tool 111, and into this chamber opens a suction pipe 116 which leads from a conduit which is connected both to a vacuum device 117 and a pre-vacuum device 118 (FIG. 1).

A control valve 119 (FIG. 1) is disposed between the pre-vacuum device 118 and the suction pipe 116. The purpose of the valve 119 is to connect the chamber 115 to the pre-vacuum device 118 so that at the instant when the edges of the shaping tool 111 abut the sagging plastic band 114 air is sucked out of the chamber 115 for a short period, and therefore out of the cavities 113, in order thereby to remove some of the initial sag of the plastic band 114 before the actual shaping operation is initiated.

A valve 120 is disposed between the vacuum device 117 and the suction pipe 116 so as to put the chamber 115 into communication with the vacuum device 117 whereby the actual vacuum deep-drawing operation may be controlled.

Also connected to the chamber 115 above the shaping tool 111 is an air outlet pipe 121 which is provided with an adjustable pressure-reducing valve 122 and a shut-off valve 123.

For the upward and downward movement of the shaping tool 111, the latter is connected to piston rods 131 of a hydraulic lifting and lowering device whose cylinders 132 are disposed above the shaping tool 111 on a platform 133 fixed to the machine frame. The platform 133, together with the machine frame, also carries guide elements 134 for the shaping tool 111. Pipes 135 and 136 connecting the two hydraulic cylinders 132 are connected by way of a control valve 137 to an oil pressure device 138.

A series of elements 141, for assisting in the drawing of the plastic band 114 in the cavities 113, are disposed below the shaping tool 111 and the band 114; these elements 141 will be referred to as draw-promoting elements and are illustrated more particularly in FIGS. 2, 2a and 2b. The draw-promoting elements 141 have shapes corresponding approximately to the shapes of the cavities 113 in the shaping tool 111, and the said elements are mounted on a common carrier 142 which is displaceable vertically. The guide elements 134 are extended downwardly so as also to guide the carrier 142 on the machine frame. The carrier 142 is mounted on piston rods 143 of a pneumatic operating device whose cylinders 144 are fixed on a platform 145 on the machine frame below the carrier 142. The pneumatic cylinders 144 are connected by upper and lower air supply pipes 146 and 147, respectively, and a control valve 148, to a compressed air supply 149.

The detailed construction of a draw-promoting element 141 is shown in FIG. 2b. The element 141 is provided internally with a cavity 150 from which ducts 151 lead to the surface of the element. The surface of the draw-promoting element 141 is covered with a porous layer 152, for example, felt or foamed plastic, which acts as a heat-insulator.

Each draw-promoting element 141 is inserted by its lower stem 153 in the carrier 142 which also is of hollow construction and communicates by way of a pressure pipe 154 and a control valve 155 with a device 156 for supplying hot compressed air.

The shaping device 111 operates in the following manner:

In the position illustrated in FIG. 1, the shaping tool 111 is located in its upper position. A section of plastic band 114, heated in the heating device 101, has just been pulled the length of one working step by the conveying device to below the shaping tool 111. Owing to its dead weight and to the heating effected in the heating device 101, the band 114 sags below the shaping tool 111. First of all the shaping tool 111 is lowered into the position illustrated in FIG. 2 by the hydraulic device 131 to 138. In this position, the lower edges of the shaping tool 111 abut in air-tight manner the plastic band 114. This traps air between the band and the coextensive surface of the shaping tool. If the plastic band 114 sags too much, the valve 119 is opened for a short time and the plastic band thereby is brought to a position having a desired initial sag. The valve 119 is then closed. Then the draw-promoting elements 141 with their carrier 142 are lifted by the pneumatic operating device 143 to 149 from the position shown in FIGS. 1 and 2 into the position shown in FIG. 2a. At the same time, hot compressed air is blown from the device 156 through the control valve 155 and supply pipe 154 and through the porous layers 152 on the draw-promoting elements 141. A pressure is produced between the shaping tool 111 and the plastic band 114 when the band is lifted with the elements 141, and this pressure pre-stretches the band 114 to substantially the shape of the draw-promoting elements 141 without allowing the band 114 to bear against the cold shaping tool 111. By this operation there is obtained a substantially uniform stretching of the plastic band 114 and, as a result, substantially uniform wall thickness in the shaped plastic article.

During the upward movement of the draw-promoting elements 141, the air outlet valve 123 is opened, so that the pressure formed between the shaping tool 111 and the plastic band 114 is reduced through the adjustable pressure-reducing valve 122. As soon as the draw-promoting elements 141 have reached their upper position and the said pressure has been reduced, the air outlet valve 123 is again closed and at the same time the valve 120 between the vacuum device 117 and the chamber 115 of the shaping tool 111 is opened. The pre-stretched plastic band 114 is then finally sucked into the cavities 113 of the shaping tool 111 and bears tightly against the surfaces of the said cavities 113 and in contact with the cold shaping tool 111. As a result, the band cools very quickly and is given the desired shape.

After the band has cooled in contact with the shaping tool 111, this shaping tool is lifted into its rest position as shown in FIG. 1. As the cooled band is retained by the conveyer device the shaped portions are withdrawn from the cavities of the shaping tool 111.

If the shaped portions of the band are relatively deep special withdrawing or ejecting means are used at the shaping tool 111 as they are described with respect to FIG. 14 of the drawing.

In order to maintain the shaping tool 111 at a temperature sufficiently low to ensure the desired quick cooling of the plastic band as it comes in contact with the mold member 111, the said member 111 may be provided with cooling canals (not shown) connected to a temperature controlled cooling system known per se.

In order to ensure a reliable positioning of the band 114 against the lower edges of the shaping tool 111 during the upward movement of the draw-promoting elements 141 and during the drawing of the plastic band 114 by suction into the cavities 113, a pattern frame 161 (FIG. 2) may be provided; at the beginning of the upward movement of the draw-promoting elements 141 this frame 161 is swung upwards against the underside of the plastic band 114.

A conveying device which comprises substantially two upper chains 171 and two lower chains 172 is provided for the stepwise conveyance of the plastic band 114. The chains 171 and 172 are driven by sprocket wheels 173 and 174, respectively, which engage the chains. The sprocket wheels 173 and 174 are connected to a common driving arrangement which comprises substantially a motor 175 and a reduction gear 176. The motor 175 is provided with a cut-in relay 177 included in an electrical control line 178 which also includes a switch 179 which is closed when the shaping tool 111 and the punching-out device 104 are both in their upper positions. A switch 180 also is included in the control line 178 and is operated by the motor 175, or by the reduction gear 176, to break the control line 178 of the relay 177 as soon as the motor has carried out a specific number of revolutions to convey the plastic band 114 the distance of one working step.

Chain links 181 and 182 of the upper chains 171 and lower chains 172, respectively (FIGS. 3 and 3a), are provided with gripper projections 183 and 184 which may be provided with a friction lining 185 of, for example, plastic material or rubber. The angularly bent-over gripper projections 183 and 184 on the chains 171 and 172 project between two wall portions 186 and 187 of the machine frame and grip the edges of the band 114 therebetween. Also, links 181 and 182 travel between two resiliently mounted guide bars 188 and 189 which assist in causing the plastic band 114 to be gripped. In order to make the spring action of the guide bars 188 and 189 effective, there is provided a counter-guiding bar 190 which is disposed between the links 181 and 182 of the two chains 171 and 172.

The conveying device extends through the heating device 101 and the shaping device 102 and for some distance beyond the shaping tool 111, but it releases the plastic band 114 with the parts shaped therein in the region of the cooling path 103.

The construction of the heating device 101 is substantially shown in FIGS. 8, 9 and 9a. It has a length at least as long as one feed step of the conveying device. The heating device used in the embodiment illustrated is an infra-red heating device wherein one heater 191 is disposed above the band 114 and a further heater 192 is disposed below the said band. Each of the heaters 191 and 192 contains a plurality of tubular heating elements 193, known per se, which are operated with current taken from any conventional electric lighting mains.

The heating elements 193 in the upper heater 191 are disposed transversely of the direction of travel of the band 114 and each element extends over the entire width of the said heater, whereas in the lower heater 192 the heating elements 193 are arranged longitudinally with respect to the direction of travel of the band 114 and the series of elements extends over the entire width of the heater 192. As shown more particularly in FIG. 9, the outer heating elements 193a are arranged closer together than the inner heating elements 193b in order thereby to compensate for thermal losses at the margins of the heaters 191 and 192. Since the extent of the said marginal losses depends to a considerable extent on the thickness of the plastic band 114, the heating elements 193 are mounted to be displaceable transversely to their longitudinal direction in the heaters 191 and 192. For this purpose, as shown in FIG. 9a, the heating elements are disposed with their terminal connecting caps 194 and 195, respectively, clamped between two connecting and contact strips 196 which are connected to the supply of electric current. The strips 196 are made resilient over their whole length or are resiliently mounted, so that mere displacement of the end connecting caps 194 and 195 is sufficient to displace the heating elements 193 transversely to their longitudinal direction and at the same time to ensure good electrical connection.

The cooling path 103 which follows the shaping device 102 is, in the embodiment illustrated, approximately of the length of one feed step but may be shorter by about 0.5% to 1.0% and its length is adjustable; this is represented in FIG. 1 by the plastic band 114 together with the shaped parts 201 thereon bulging slightly upwards over the length of the cooling path 103. The cooling path 103 is bridged by a table or platform 202, in order to prevent the leading end of the band 114 from sliding downwards between the shaping device 102 and the punching-out device 104. The platform 202 is divided centrally at the point 203, in order to permit adjusting the positions of the punching-out device 104 and the shaping device 102 relatively to one another.

The construction of the punching-out device is shown in detail in FIGS. 4 to 7, whilst the general arrangement is shown in FIG. 1. Cutting dies 211 and locating devices connected therewith are mounted on a common carrier 212 which is displaceable vertically, being guided by guide elements 213 on the machine frame. For the upward and downward movement of the cutting die carrier 212, a hydraulic operating device is provided, comprising piston rods 214 connected to the carrier 212, the piston rods 214 being mounted in hydraulic cylinders 215. Upper and lower connecting pipes 216 and 217 of the cylinder 215 are connected by way of a control valve 218 to an oil pressure reservoir 219.

A punching platform 220 is disposed below the cutting die carrier 212, the said platform being provided with apertures 221 through which the punched-out shaped workpieces descend. A collecting and forwarding device 105 for the punched-out articles is located below the platform 220, this device being explained in more detail hereinafter with reference to FIGS. 10 to 12.

Each cutting die 211 is connected to a locating device which brings the shaped article into the correct position relatively to the die before the latter comes into action. There are various possibilities, which are illustrated in FIGS. 5, 6 and 7, for the construction of the locating device.

The plastic band 114 with the shaped parts 201, guided by the chains 171 and 172 in the direction of the arrow 222 (FIG. 4) stepwise from the region of the shaping device 102 into the cooling zone 103, is brought between the cutting die carrier 212 and the punching platform 220 which comprises, for example, celluloid or other elastic material or is covered with such material. Owing to the fact that the cooling zone 103 is about 0.5% to 1.0% shorter than one feed step, the shaped articles 201 are located in such a manner between the cutting die carrier 212 and the punching platform 220 that the articles come to a standstill somewhat further in the direction of the arrow 222 than the optimum position at punching devices 223.

As shown in FIG. 5, the punching devices comprise cutting dies 211 and locating sleeves 224 which, in this case, are mounted inside the dies 211 and are displaceable substantially parallel thereto. Then when the cutting die carrier 212 is forced downwards, the shaped articles 201 are first of all engaged by the locating sleeves 224, which terminate substantially conically at the bottom ends, and are so displaced on the platform 220 that they are brought into alignment with the apertures 221. As a result, it is ensured that the shaped articles will be cut out centrally, or in accordance with whatever contour they have, when the cutting dies 211 subsequently descend.

When the cutting tool moves upwards again, the shaped parts 201 which adhere slightly to the cutting dies 211 are ejected by rubber bellows 225 and are pushed through the apertures 221 in the punching platform 220 and transferred to the collecting and forwarding device.

Instead of the rubber bellows 225, it is also possible to use a mechanical ejecting means, for example pistons. But as compared with such mechanical ejecting means, the bellows 225 made of rubber or some other elastic material have, inter alia, the advantage of cheapness and the fact that they can be readily interchanged for use in conjunction with cutting dies of another form or the like.

The cutting die carrier 212 is provided, preferably, at its lower side with crosswise and transversely disposed grooves 226. The grooves 226 connect an air supply pipe 227, mounted in the cutting die carrier, to the individual bellows 225. The grooves 226, together with carrier parts 228 for the cutting dies 211 and carrier parts 229 for the bellows 225, form a closed air supply and discharge duct system. As FIG. 1 shows, the pipe 227 is connected by way of control valves 231 and 232 to a vacuum device 233 and a compressed air supply 234, respectively. For the ejection of the punched-out shaped articles 201, the valve 232 is opened for a short time, whereupon the bellows 225 are filled with compressed air. In order to return these bellows 225 to their initial position, the valve 232 is closed and for a short time the valve 231 is opened, so that the air contained in the bellows 225 is removed by suction.

FIG. 6 shows a modified form of cutting device. The punching platform 220 may consist of a cutting plate of steel which is provided with perforations 221 for the shaped articles 201 and is mounted on a corresponding fixed carrier 241. Locating sleeves 242 also act as cutting dies, and are slightly conical in shape so as first of all to locate the shaped workpiece 201 in its correct position before it is cut out of the plastic band 114. For stripping off the remnants of the plastic band 114, stripping plates 243 can be provided at the ends of the devices 242 in this embodiment.

If for any reason the shaping tool 111 is so constructed that the shaped workpieces are below the plane of the plastic band 114, as at 254 in FIG. 7, it may be expedient to use a punching-out device as shown diagrammatically in FIG. 7. In the right-hand half of FIG. 7 there is illustrated means for cutting out the shaped workpiece 251 without a rim; the correct location of the workpiece 251 relatively to a cutting die 252 is ensured by an aperture 253 in a punching platform 254. If, on the other hand, as is illustrated in the left-hand half of FIG. 7, the workpiece 251 is to have a rim when cut out, it is preferable to mount a slightly conical locating element 256 in the interior of a cutting die 255 in such a manner as to be displaceable axially relatively to the die 255. In the embodiment shown in FIG. 7 it is preferable for the punching platform 254 also to be so mounted as to be capable of displacement upwards and downwards, and to be provided with a suitable hydraulic shifting device.

FIGS. 10 to 13 show the collecting and forwarding device for the punched-out shaped workpieces 201. This device comprises bar-shaped collecting elements 301 which are mounted on a common carrier 302 and are displaceable therewith vertically. For this purpose the carrier 302 is mounted on piston rods 303 of a pneumatic operating device which is disposed below the carrier and comprises compressed air cylinders 304 which are connected in parallel and are connected to a compressed air supply 305 by way of a control valve 306.

The collecting elements 301 project upwards from the carrier 302 through guide apertures in a collecting platform 307 disposed below the punching platform 220 and also through the apertures 221 in the punching platform 220. The length of stroke of the pneumatic operating device 303—304 is so calculated that in the bottommost position of the carrier 302 the upper ends 308 of the collecting elements 301 are flush with, or below, the upper surface of the collecting platform 307.

As FIGS. 12 and 13 show, the carrier 302 for the collecting elements 301 consists of a frame which is formed of tubes 309, and is provided with a connecting pipe 310. The collecting elements 301 likewise are tubular and are mounted in the tubes 309. The passage 311 in the collecting elements 301 opens into the passage 312 of the tubes 309, and the upper end of the passage 311 in a collecting element 301 opens into the middle of a suction cup 313 mounted on the element. The suction cup 313 is made of elastic material, for example rubber. A vacuum device 315 is connected, by way of a control valve 314 and the connecting pipe 310, to the carrier 302.

An ejecting device is provided for forwarding the punched-out shaped workpieces 201 which have been guided by the collecting elements 301 on to the collecting platform 307. The ejecting device comprises an ejecting plate 321 which is displaceable horizontally over the collecting platform 307. The ejecting plate is provided with an actuating device, for example, a bellows 322 made of rubber or some other elastic material, which is connected by way of a control valve 323 to the vacuum device 315 and to the compressed air supply 305. The valve 323 is provided with a control lever 324, which is constantly urged upwards by a spring 325. In the upper position of the actuating lever 324 the bellows 322 is connected to the vacuum device 315, whereas in the lower position of the lever 324 the bellows is connected to the compressed air device 305. The lever 324 is so positioned that it is pressed downwards by the carrier 302 for the collecting elements 301 when the said carrier reaches its lower end position.

During operation, the carrier 302 with the collecting elements 301 is normally in the lower end position. As soon as the conveying device has advanced the plastic band 114 by one feed step, the actuating valve 306 is changed over and thereby the carrier 302 and the collecting elements 301 are lifted by a very small amount which is sufficient to allow the lever 324 to switch over the valve 323 to connect the bellows 322 to the vacuum installation 315. As a result of this the extended bellows 322 is contracted and the space above the collecting platform 307 is freed for the collecting elements 301 which pass through the surface of the collecting platform 307 and through the apertures 221 in the punching platform 220 from below into the shaped workpieces 201 and bear with their suction cups 313 against the under faces of the said workpieces. A vacuum from the vacuum device 315 through the valve 314 is applied to the suction cups 313 which attach themselves securely to the under faces of the shaped workpieces 201. As soon as the punching operation described hereinbefore has been concluded, the valve 306 is changed over and the carrier 302 with the collecting elements 301 is lowered. As soon as the shaped workpieces 201 have been placed on the collecting platform 307, the valve 314 is shut off and the connection between the suction cups 313 and the shaped workpieces 201 is broken. The collecting elements 301 then sink below the collecting platform 307. As soon as the carrier 302 reaches its lower end position, it again operates the valve 323 with its lever 324 and connects the bellows 322 to the compressed air supply 305. The bellows 322 expands and the plate 321 pushes the shaped workpieces 201 along the platform 307 on to a distributor 330. The distributor 330 comprises a rotating disc 331 which is driven by a motor 332 by way of a reduction gear 333. The disc 331 carries centrally on its upper face a cone 334, and there also is a deflecting plate 365 for transferring the punched-out shaped workpieces 201 to an elongated conveying device which comprises at its front end conveying rollers 341 which are driven by the motor 332 by way of gearing 342. The rollers 341 transfer the shaped workpieces 201 to a platform 351 of a second punching device 350. The second punching device 350 is constructed substantially in the same manner as the first punching device 104, but has only a single punching element 352, provided with a single cutting die, which trims all the workpieces 201 to exactly the same size. An electric motor 353 with a reduction gear 354 connected thereto is provided for operating the second punching device 350. The reduction gear 354 is preferably an infinitely variable gear in order to permit adaptation of the operation of the punch 352 to the travelling speed of the distributor 330. The gear 354 carries at its output side an eccentric 355 which is mobile on the upper end of the operating push rod 356 of the punch 352. Disposed about the push rod 356 is a spring 357 which urges the punch 352 into its upper position.

The shaped workpieces 201 are forwarded from the rollers 341 by a feed means, known per se and not shown, to the punching platform 351 and thence after the second punching operation to a conveyor belt 361. The waste material produced at the second punching device 350 is removed from the punch 352 by a device, known per se, which is not shown.

It is to be noted that the second punching device 350 is only to be put into operation when the workpieces produced are to be trimmed to size with great precision. This is the case more particularly with precision articles and workpieces which are intended for example for delivery to automatic machines. It should be borne in mind that when the second punching device 350 is in operation, the punching cylinders 323 of the first punching device are so selected that an appropriate rim of material is left on the workpieces 201 for subsequent trimming.

From the second punching device 350, the workpieces travel over a conveyor belt 361, and are tested for shape and quality. At the end of the conveyor belt 361 is situated a deflecting device 362 containing a deflecting plate 363 which provides a tripping edge 364 at its upper end. The workpieces 201 arriving at this tripping edge 364 are tilted over thereby and travel head-first through the deflecting device 362 into a pack 365. A counting device 366, known per se, which is illustrated diagrammatically, can be arranged between the pack 365 and the deflecting device 362.

FIGS. 14 to 16 show a modified embodiment of the invention. In said embodiment the shaping tool 111 is provided with additional means to withdraw the shaped plastic band from the mold member or shaping tool 111. Said additional means comprise an ejecting plate 401 mounted at the lower side of the shaping tool 111 for additional movement in vertical direction with respect to the shaping tool 111. Said ejecting plate 401 may occupy the entire lower surface of the shaping tool 111, but with the exception of openings according to the entrance area of the mold cavities of the shaping tool 111.

Preferably said entrance portions for the mold cavities are surrounded by wall portions 402 extending into the openings of said ejecting plate 401. Spring means 403 are provided to urge the ejecting plate 401 into its lower rest position, said spring means 403 located in bores 404 which are provided in the mold portions between the mold cavities. In order to limit the movement of said ejecting plate 401 at its lower rest position ring parts 405 are fixed at the lower end of the wall portions 402. Said rings 405 cooperate with rim portions 406 to limit the movement of the ejecting plate in its lowest position.

In operation when the shaping tool 111 is lowered onto the plastic band said ejecting plate 401 comes into contact with the rim portions of said plastic band. During further lowering of the shaping tool 111 the ejecting plate is lifted with respect to the shaping tool, whereby the tension of the springs 403 is increased. In upward movement of the shaping tool 111 springs 403 urge again the said ejecting plate 401 downwardly with respect to the shaping tool 111. Thereby the not shaped rim portions of the plastic band are urged downwardly with respect to the shaping tool and the shaped portions of the plastic band are withdrawn from the mold cavities.

Additionally to the ejecting plate 401, pressure air ejecting means may be provided. Such means comprise a pressure air producing machine or a pressure air container 411 connected to the common chamber 115 of the shaping tool 111 through an automatically actuated valve 412. In operation valve 412 is opened during the upward movement of the shaping tool 111. Thereby pressure air is introduced into the common chamber and from there into the mold cavities through the connecting canals of the shaping tool. Thereby the shaped portions of the plastic band are urged out of the mold cavities. As soon as the shaping tool has reached its upper end position valve 412 is closed.

Further on FIGS. 14 and 16 show that conveyer means of any other suitable kind than those ones as shown in FIGS. 1 to 3 may be used in connection with the invention. In the embodiment of FIGS. 14 to 16 the conveyer device comprises a multitude of pairs of rollers 421 and 422. Each one of said pairs comprises a driven roller 422 and a pressing roller 421. The driven rollers 421 each have a knurled conveying surface while the pressing rollers 422 have soft surfaces e.g. by means of a layer of rubber or felt or the like material.

The pressing rollers are rotatably carried by carrier means 423 vertically slidable with respect to the frame 424 and downwardly urged by spring means 425. The driving rollers 422 are rotatably mounted to the frame 424 and driven by driving means 175, 176 e.g. as shown in FIG. 1, through a common driving shaft 426 having a worm 427 engaging worm gears 428, one for each roller 422.

In operation the side edges of the plastic band are pressed between the rollers 421 and 422. To convey the band stepwise the rollers 422 are driven for one conveying step and then they are stopped until the next conveying step shall be undertaken. In order to avoid lateral displacement of the plastic band the said knurling of rollers 422 may have V-shape or the like.

A further additional feature of the embodiment according to FIG. 14 is a multi-stage heating device. FIG. 14 shows a two-stage heating device but there may be used also more than two stages. The several heating stages follow each other immediately but they are independent from each other. According to FIG. 14 the two heating stages 431 and 432 have the same structural features as they are described in connection with FIGS. 8, 9 and 9a.

The two stages are so controlled that the temperature at the second stage 431 is sensibly higher than at the first stage 432. Thereby the infrared radiation of the first stage has a longer wavelength in order to heat the plastic band first in its interior zone stronger than at its surfaces. This preheating is so controlled that the band leaving the preheating stage just does not form a depending sag. Such sag is then formed in the second heating stage in which infrared radiation of shorter wavelength is used to soften the band also at its surfaces. In order to ensure a proper band transport from the first stage 432 to the second stage 431 a guiding roller 433 extending transversely over the entire band may be rotatably mounted between the two heating devices 431 and 432.

FIGS. 17 to 20 show a modified embodiment of the collecting and forwarding device for the punched out shaped workpieces 201. In this embodiment the punching out device 104 has the same structural features as they have been described with respect to FIGS. 1, 4 to 6 and 11. Therefore the same reference numbers relate to the same parts as they are shown in the said FIGS. 1, 4 to 6 and 11. In the embodiment of FIGS. 17 to 20 the punched out workpieces fall vertically down through openings 221 in the punching platform 220 onto the collecting and forwarding device. Said collecting and forwarding device comprises a continuously driven conveyer belt 440 in subjacent position to the punching platform 220 as schematically shown in FIG. 18. A receiving cage 441 is provided in the space between the conveyer belt 440 and the punching platform 220, said cage 441 consisting of crossing metal sheets 442 fixed within a frame 443 and providing for as many receiving compartments as openings 221 are provided in the punching platform 220. Said frame 443 is connected for up- and downward movement through piston rods 445 with hydraulic cylinders 444 similar to the hydraulic cylinders 215 of the punching device. Upper and lower connecting pipes 446 and 447 of the cylinders 444 are connected by way of a control valve 448 to an oil pressure reservoir 449.

In operation the falling down workpieces are received by the compartments of cage 441 ensuring upright positioning of the workpiece onto the conveyer belt 440. When the workpieces 201 have been collected onto belt 440 and have been stabilized in upright position the cage 441 is moved upwardly and the workpieces 201 are released to travel with the conveyer belt 440. In order to avoid that the workpieces fall over during the upward movement of the cage 441, said upward movement should be sudden as a jerk.

As may be seen from FIG. 17, the workpieces 201 are moved along deflecting sheets 450 and 451 in order to put them in one line. If necessary the belt conveyer may comprise a first belt subjacent to the punching platform 220 and a second faster driven belt in the region of the deflecting plates 450 and 451. At the end portion of the belt conveyer discharge means are provided at the side edge of the belt. Said discharge means comprise a rotating disc 452 having teeth 453 and between these teeth 453 rounded edge portions 454 adapted to the shape of the workpieces.

A guiding plate 455 is fixed to the conveyer frame below said discharge disc 452. A guiding wire 456 surrounds the disc 452 in a space adapted to the diameter of the workpieces 201. By this guiding wire 456 such workpieces which are not properly engaged by the discharging disc 452 are thrown back onto belt 440 in order to be conveyed to a container 457.

Disc 452 and conveyer belt 440 are driven by an electrical motor 458 through gear means 459.

As may be seen from FIGS. 17, 19 and 20 a special treatment station may follow the discharge disc 452, to provide for rounded end portions 460 of the workpieces 201. Said treatment station involves a rotating disc 461 carrying form sockets 462 onto which the punched out workpieces are fed by the discharge disc 452 through an opening 463 in the guiding plate 455. An additional heated shaping member 464 is provided for each form socket 462 and is mounted for the same rotation movement as its form socket 462 but at the same time for up- and downward movement with respect to the form socket 462. Therefore a guiding disc 465 is fixed to the carrier disc 461. The up- and downward movement of tools 464 is controlled by stationary guiding rails 466 within which guiding rollers 467 of the forming elements 464 are running.

The additional forming tools as shown in FIG. 20 consist of a tool head 468 and a guiding tube 469, the tool head comprising at its inner surface a conical entrance zone 470, a slightly conical directing zone 471 and a rounded forming zone 472. The tool head 468 is further provided with electrical heating means 473.

In the additional treatment station further pressure air means 474—486 are used to press the workpiece 201 onto its form socket 462 during the feeding action and to discharge the workpiece from said station.

In operation the workpiece 201 falls through the opening 463 of the guiding plate 455. At the same time pressure air valve 476 is opened by an actuating nose 477 one of which is attached to each form socket 462 and cooperating with an actuating rod 478 of valve 476. Pressure air is blown through nozzle 475 from above onto the workpiece 201 to press it onto said form socket 462. As soon as nose 477 leaves rod 478 during the rotation of discs 461 and 465 driven by driving means 479 through a driving pinion 480 and a gear ring 481, valve 476 closes. During the further rotation of the said discs 461 and 465 tool 464 is lowered by the guiding rails 466. Thereby the conical zone 470 of the inner tool surface comes in contact with the outer edge of the rim 482 of the workpiece 201 and during continued lowering down of the tool 464 the said rim 482 is introduced in the conical zone 471 of the inner tool surface. Thereby said rim is bent in vertical direction and is introduced into the rounded zone 472 to become entirely rounded. After this forming action the tool 464 is lifted again during its circular path by the guiding rails 466. But the workpiece remains on its form socket and comes in its circular path in subjacent position to a discharge tube 483. At the same time a second actuating nose 484 each one of which is attached to each form socket 462, comes in contact with the actuating rod 485 of a second air valve 486. A compressed air jet is blown by nozzle 487 through a bore 488 into the hollow part of the workpiece 201, said workpiece 201 being blown thereby through the discharge tube 483 onto a discharge conveyer belt 489.

Counting means 490 may be used at said discharge conveyer belt 489 as well as collecting means 491 for the workpieces 201. Said collecting means may comprise deflecting plates 491 and a discharge door 492 which is controlled by the counting means 490 in order to collect a desired number of workpieces 201 e.g. fifty pieces and to introduce them into a container 493.

While there have been described herein and illustrated in the drawing certain particular embodiments of this invention, it is not intended that this invention be limited to or circumscribed by the specific details herein described or illustrated in the drawings in view of the fact that this invention is susceptible to modifications depending on individual preference and conditions without departing from the spirit of this disclosure and the scope of the appended claims.

I claim:

1. In apparatus for the continuous production of shaped workpieces from a band of thermoplastic material, means providing in succession a heating station and a separate shaping station spaced from said heating station, means at said heating station for heating the section of said band therein until said section of the band sags, means for moving the band away from said heating station to dispose said heated section in the shaping station, a shaping tool having a plurality of forming cavities opening toward said band and a rim surrounding said cavities, said shaping tool being mounted adjacent said shaping station for movement between an upper position out of contact with the band and a lower position in contact with said heated band section, said tool having only its outer rim in fluid pressure tight engagement with said band section in the lower position, means for applying vacuum through said tool to draw said heated sagging band section toward the tool, and means disposed below the band for pressing the heated band section upwardly toward said tool for aiding said tight contact between the tool rim and the heated section of said band.

2. In the apparatus defined in claim 1, a plurality of draw-promoting elements mounted below the sagging band opposite said shaping tool cavities, means for raising said elements to displace portions of said band partially into the cavities and thereby prestretching said portions substantially to the shape of said elements, means providing a covering of low heat conductive porous material on each of said draw promoting elements, and means acting through said elements for blowing heated air through said coverings during upward movement of said elements.

3. In the apparatus defined in claim 1, means effective immediately before said displacement of portions of the band into the cavities providing an air cushion within the tool between the upper surface of the band section and the tool, said air cushion being conditioned before shaping and being entirely removed prior to application of the vacuum drawing operation, said air cushion conditioning means having a valved outlet from said cavities to atmosphere.

4. In the apparatus defined in claim 1, an ejecting plate mounted for vertical displacement in the lower surface of said tool, and resilient means interposed between the plate and tool, said resilient means compressing for cushioning engagement of the tool with said band and expanding during upward movement of the tool for ejecting the shaped band section away from the tool.

5. In apparatus for the continuous production of shaped workpieces from a band of thermoplastic material, means providing in succession a heating station and a separate shaping station spaced from said heating station, means at said heating station for heating the section of said band therein until the material loses sufficient elasticity that said section of the band sags, said heating means comprising a plurality of infrared radiator elements spaced to vary the distribution of heat for controlling the forming of the sag in said band section, means for moving the band away from said heating station to dispose said heated section in the shaping station, a recessed shaping tool mounted adjacent said shaping station for movement between an upper position out of contact with the band and a lower position in contact with said heated band section, said tool having rim areas in fluid pressure tight engagement with said band section in the lower position and a cavity defining portion within the rim means for providing an air cushion between the upper surface of the sagging band section and said tool, means for conditioning said air cushion to form a desired initial sag rate, means disposed below the band mounted for upward movement for pressing the band upwardly into said tool cavities and for aiding said tight contact between the tool rim and the heated section of said band, and means for applying vacuum through said tool to draw said displaced band section into contact with the tool within the cavities.

6. In the apparatus defined in claim 5, said heating means comprising groups of radiator units arranged above and below the band at the heating station, the tubes of the respective groups extending longitudinally and transversely of the band, and means for adjusting all of said tubes transversely of their lengths for obtaining optimum heat control spacing.

7. In apparatus for the continuous production of shaped workpieces from a band of thermoplastic material, means providing in succession a heating station and a separate shaping station spaced from said heating station, means at said heating station for heating the section of said band therein until said section of the band sags, means for moving the band away from said heating station to dispose said heated section in the shaping station, a shaping tool mounted adjacent said shaping station for movement between an upper position out of contact with the band and a lower position in contact with said heated band section, said tool being in fluid pressure tight engagement with said band section in the lower position and formed with cavities facing the band, means for providing an air cushion within the tool between the upper surface of the band section and the tool, means for conditioning said air cushion, means disposed below the band mounted for upward movement for pressing the band upwardly toward said tool, means for applying vacuum through said tool to draw said heated sagging band section into the tool cavities, means for stripping the band from said shaping tool and moving the shaped portion into a punching station, means for moving said band in a step of predetermined length into a cooling zone between the shaping and punching stations, said cooling zone having a length in the direction of movement of said band which is about ½ percent to 1 percent less than said predetermined step length, and means in said punching station for first registering the shaped band portion with cutting means and then cutting the shaped workpieces from said band, the shaped band portion entering said punching station having a plurality of projecting shaped workpieces, said registering means comprising members engaging said workpieces and normally covering the cutting edges of said cutting means but being displaced after contact with said band to uncover the cutting edges and permit said cutting means to cut said workpieces from said band, and means for ejecting said cut workpieces with respect to said punching means comprising an expansible fluid pressure operated device associated with said cutting means and means for expanding said device after each cutting operation.

8. In a process for the continuous production of shaped workpieces from an elongated band of thermoplastic synthetic material, the steps of disposing said band of material in a substantially horizontal plane, heating said band in a zone corresponding in size to the size of a shaping tool having downwardly opening cavity molds to cause the heated band in said zone to sag downwardly out of said horizontal plane, said tool having a relatively cold shaping surface including said cavity mold surfaces, displacing said heated and sagging portion of said band to a position under and spaced from said shaping tool, moving the shaping tool downward toward said heated and sagging portion of said band providing an air cushion between said shaping tool and said heated and sagging band portion by said downward movement of said tool before the rim of said tool is brought into fluid tight contact with said band, conditioning the sag of said band by regulating the pressure of said air cushion immediately before shaping, and shaping said workpieces by suction drawing said heated and conditioned sagging band portion upward into said cavity molds and into contact with said cold tool surface.

9. The process according to claim 8 together with the first shaping step of mechanically urging said sagging portion of said band from said initial sag upwardly into said cavity molds but in spaced relation with said shaping surface at any point of the said cavity molds while maintaining a cushion of air at the underside of said portion of said band.

10. In the apparatus defined in claim 1, means connected to said shaping tool for conditioning said heated band section in contact with said shaping tool to provide an initial predetermined sag before shaping.

11. In apparatus for the continuous production of shaped workpieces from a band of thermoplastic material, means providing in succession a heating station and a shaping station, means at said heating station for heating the section of said band therein until the material loses sufficient elasticity that said section of the band sags, means for moving the band to dispose said heated section in the shaping station, a shaping tool mounted for movement between an upper position out of contact with the band and a lower position in contact with said heated band section, said tool having a plurality of downwardly facing cavities corresponding to the workpieces to be formed and a surrounding rim, means for relatively moving said tool and band toward each other to engage the rim of the tool with said heated band section, draw elements disposed below the band mounted for upward movement for pressing the band upwardly toward said tool, a clamping frame movably mounted below said heated band section, means for moving said draw elements upwardly to displace portions of said heated band section into said tool cavities and at the same time moving said frame to clamp the heated band section pressure tight with said tool rim leaving that part of the sagging band within the rim free to drape over the draw promoting elements, and means for applying vacuum through said tool to draw said heated sagging band section portions into surface contact within said tool cavities.

12. In a method of forming a sheet of thermoplastic material, the steps of heating said sheet to a temperature rendering it moldable and causing it to sag downwardly out of a horizontal plane, disposing said heated and sagging sheet over a draw promoting element and under a cavity mold having a forming surface materially cooler than said heated and sagging sheet providing a spacing cushion of air between said heated and sagging sheet and the adjacent surface of said cavity mold, preforming said heated and sagging sheet through relative movement between said element and cavity mold to bring said element into said cavity mold with said heated and sagging sheet interposed but out of contact with said cool cavity mold surface, introducing simultaneously with said relative movement heated air under pressure through said element against said heated and sagging sheet, and subsequently removing said air cushion and applying vacuum to said other side of said sheet to draw said sheet into conformity with said cool cavity surface.

References Cited in the file of this patent

UNITED STATES PATENTS

| | | |
|---|---|---|
| 1,318,700 | Skolnick | Oct. 14, 1919 |
| 1,654,647 | Heist | Jan. 3, 1928 |
| 2,229,613 | Strauch | Jan. 21, 1941 |
| 2,282,423 | Kopitke | May 12, 1942 |
| 2,442,338 | Borkland | June 1, 1948 |
| 2,532,844 | Hulbert et al. | Dec. 5, 1950 |
| 2,749,572 | Nowak | June 12, 1956 |
| 2,891,280 | Politis | June 23, 1959 |
| 2,967,328 | Shelby et al. | Jan. 10, 1961 |
| 2,973,558 | Stratton | Mar. 7, 1961 |

FOREIGN PATENTS

| | | |
|---|---|---|
| 791,097 | Great Britain | Feb. 26, 1958 |
| 796,821 | Great Britain | June 18, 1958 |
| 1,134,142 | France | Nov. 26, 1956 |
| 1,144,195 | France | Apr. 23, 1957 |

OTHER REFERENCES

Plastic Engineering Handbook (Soc. of the Plastics Ind.), pub. by Reinhold Pub. Corp., New York, 1954 (pages 129–134, 179–186). (Copy in Sci. Library.)

Airslip Forming, Rubber and Plastic Age, July 1956, pages 460–1.

Problems Related to the Thermo-Forming of Toughened Polystyrene Sheet, British Plastics, December 1958, pp. 518–521.